United States Patent [19]

Stoughton et al.

[11] Patent Number: 4,922,413
[45] Date of Patent: May 1, 1990

[54] METHOD FOR CONCURRENT EXECUTION OF PRIMITIVE OPERATIONS BY DYNAMICALLY ASSIGNING OPERATIONS BASED UPON COMPUTATIONAL MARKED GRAPH AND AVAILABILITY OF DATA

[75] Inventors: John W. Stoughton; Roland V. Mielke, both of Virginia Beach, Va.

[73] Assignee: Center for Innovative Technology, Herndon, Va.

[21] Appl. No.: 29,665

[22] Filed: Mar. 24, 1987

[51] Int. Cl.[5] .......................... G06F 15/16; G06F 9/38
[52] U.S. Cl. .................................. 364/200; 364/230.3; 364/232.22; 364/281.4; 364/281.8
[58] Field of Search ... 364/200 MS File, 900 MS File, 364/300

[56] References Cited

U.S. PATENT DOCUMENTS

| | | | |
|---|---|---|---|
| 4,149,240 | 4/1979 | Misumas et al. | 364/200 |
| 4,153,932 | 5/1979 | Dennis et al. | 364/200 |
| 4,156,910 | 5/1979 | Barton et al. | 364/200 |
| 4,247,892 | 1/1981 | Lawrence | 364/200 |
| 4,251,861 | 2/1981 | Mago | 364/200 |
| 4,318,173 | 3/1982 | Freedman et al. | 364/200 |
| 4,319,321 | 3/1982 | Anastas et al. | 364/200 |
| 4,384,324 | 5/1983 | Kim et al. | 364/200 |
| 4,644,461 | 2/1987 | Jennings | 364/200 |
| 4,644,464 | 2/1987 | Logsdon et al. | 364/200 |
| 4,733,347 | 3/1988 | Fuknoka | 364/200 |

OTHER PUBLICATIONS

Peterson, *Petri Net Theory and the Modeling of Systems,* Prentiss-Hall, Englewood Cliffs, N.J., 1981.
Commoner et al., "Marked Directed Graphs", Journal of Computer and System Sciences, 5, 511-523 (1971).
Murata, T., "Use of Resource-Time product concept to derive a performance measure of timed Petri nets", Procs. of the 1985 Midwest Symposium on Circuits and Systems, Univ. of Louisville, Aug. 19-20, 1985.

Primary Examiner—Thomas C. Lee
Attorney, Agent, or Firm—Staas & Halsey

[57] ABSTRACT

Computationally complex primitive operations of an algorithm are executed concurrently in a plurality of functional units under the control of an assignment manager. The algorithm is preferably defined as a computationally marked graph contianing data status edges (paths) corresponding to each of the data flow edges. The assignment manager assigns primitive operations to the functional units and monitors completion of the primitive operations to determine data availability using the computational marked graph of the algorithm. All data accessing of the primitive operations is performed by the functional units independently of the assignment manager.

2 Claims, 9 Drawing Sheets

METHOD FOR CONCURRENT EXECUTION OF PRIMITIVE OPERATIONS BY DYNAMICALLY ASSIGNING OPERATIONS BASED UPON COMPUTATIONAL MARKED GRAPH AND AVAILABILITY OF DATA

ORIGIN OF THE INVENTION

The invention described herein was developed in part with U.S. Government support under contract NAS1-17993 with the National Aeronautic and Space Administration (NASA). The U.S. Government has certain rights in this invention.

BACKGROUND OF THE INVENTION

1. Field of the Invention

The present invention is related to the analysis of the concurrently processed computationally complex algorithm and, more particularly, to a data processing system that uses a Petri net model of concurrently processed computationally complex algorithms.

2. Description of the Related Art

One method which is currently being developed to increase the execution speed of computers is parallel processing of primitive operations in an algorithm. The hardware used in a data processing system having such a parallel architecture is relatively easy to develop by using, e.g., identical, special purpose computing elements each of which can access a shared memory. In comparison, it has been much more difficult to develop the software required to schedule, coordinate and communicate between the individual computing elements and other portions of the data processing system, such as external data input/output to and from terminals, printers, tape drives, etc.

Conventional multiprocessing systems typically execute a program in a single processor, while different program(s) executes in the other processor(s). The scheduling, coordination and communication problems in such multiprocessor systems are among the most complex addressed by existing computer systems. However, in the type of parallel processing discussed above, solution of coordination and communication problems is even more critical, because a single program or algorithm is being processed by more than one computing element. As a result, in addition to sharing the hardware, as in the conventional multiprocessor system, the computing elements also share data. Since a first instruction or task may be performed in a first computing element to generate intermediate data used in a second task performed by a second computing element, the flow of data in the system must be carefully controlled. Such data processing systems which referred to as performing concurrent parallel processing and may have a data-driven architecture, i.e., controlled by data flow, or a demand-driven architecture.

The differences between a data processing system performing concurrent operations and a system organized according to von Neumann principles render conventional methods of describing and defining computer operation inadequate. For example, flowcharts or conventional algorithm graphs which are useful in describing the operation of a von Neumann structure are insufficiently descriptive of the operation of a concurrent processing system. Techniques for defining and controlling the operation of a concurrent processing system is critical for the development of software to be executed on data processing systems having, e.g., a data-driven architecture.

Efforts have been made to define tasks to be performed in a data processing system for concurrent execution of primitive operations of an algorithm. For example, previous proposals for assignment of the computing elements or functional units to particular tasks have used either static or dynamic assignment. When static assignment is used, the tasks performed by each functional unit is determined during the design of a program. This requires a great deal of specificity in the program, increasing the amount of time required for development and thereby reducing the benefits gained from using data flow control in a processing system. Dynamic assignment, on the other hand, determines the task performed by each functional unit at the beginning of execution of an algorithm. This reduces the effort required during programming, but still results in fixed correspondence between a functional unit and a primitive operation during the processing of the algorithm.

SUMMARY OF THE INVENTION

An object of the present invention is to provide a datadriven architecture in which functional units are continuously assigned during concurrent execution of primitive operations of an algorithm.

Another object of the present invention is to provide scheduling, coordination and communication for a plurality of functional units concurrently executing computationally intensive primitive operations of an algorithm by providing a controlled path for each data path in a Petri net model of the algorithm.

Another object of the present invention is to provide a data processing system having multiple functional units concurrently processing computationally intensive primitive operations of an algorithm in which the operations performed by the functional units are continuously reassigned during execution of the algorithm.

Yet another object of the present invention is to provide a concurrent data processing system in which concurrency is maximized.

A further object of the present invention is to provide a data processing system having a plurality of functional units concurrently executing primitive operations of an algorithm which is slowed, but not prevented from executing an algorithm, if one or more, but not all, functional units become inoperative.

The above objects are attained by providing a method for concurrent execution of primitive operations of an algorithm in a data processing system having a data-driven architecture comprising an assignment manager, a plurality of functional units connected to the assignment manager and a global data memory connected to the functional units. The method comprises the steps of defining an algorithm in terms of primitive operations and data flow between the primitive operations; providing definitions of the algorithm and the primitive operations to the assignment manager; assigning each primitive operation to an available function unit in dependence upon the definitions previously defined as the data for that primitive operation becomes available; and monitoring completion of each primitive operation to determine data availability.

These objects, together with other objects and advantages which will subsequently apparent, reside in the details of construction and operation as more fully hereinafter described and claimed, reference being had to the accompanying drawings forming a part hereof, wherein the like reference numerals refer to like parts throughout.

DESCRIPTION OF THE PREFERRED EMBODIMENT

As discussed above, at the present time it is much easier to develop hardware for parallel processing than to develop software which takes advantage of such hardware to execute a single algorithm. While it is possible to specify the operations to be performed in each processing unit in a parallel processor, this requires a great deal of programming time and also requires that the specified number of processors be available at run time while making no use of any additional processors which might be available. This is referred to as static assignment of processing or functional units. Dynamic assignment of functional units at the time processing begins is only a slight improvement over static assignment in that it is difficult to compensate for a failure of a processing unit during execution of an algorithm. As a result, there is little fault tolerance in such systems and a great deal of programming effort is required.

According to the present invention, these obstacles are overcome by decomposing an algorithm into a sequence of primitive operations, some of which can be performed concurrently. Preferably, the algorithm is represented as a Petri net to clearly display both data flow and control flow in the execution of the algorithm. The decomposition process is performed in the three steps which follow. Each step will be described in more detail below.

First, according to a preferred embodiment of the present invention, an algorithm graph is developed which depicts primitive operations ob the algorithm and the data flow between the primitive operations. Equation (1) is an example of a relatively simple algorithm which is a discrete system state recursion:

$$X_N = B \cdot X_{N-1} + B \cdot U_N \tag{1}$$

Figure 1:
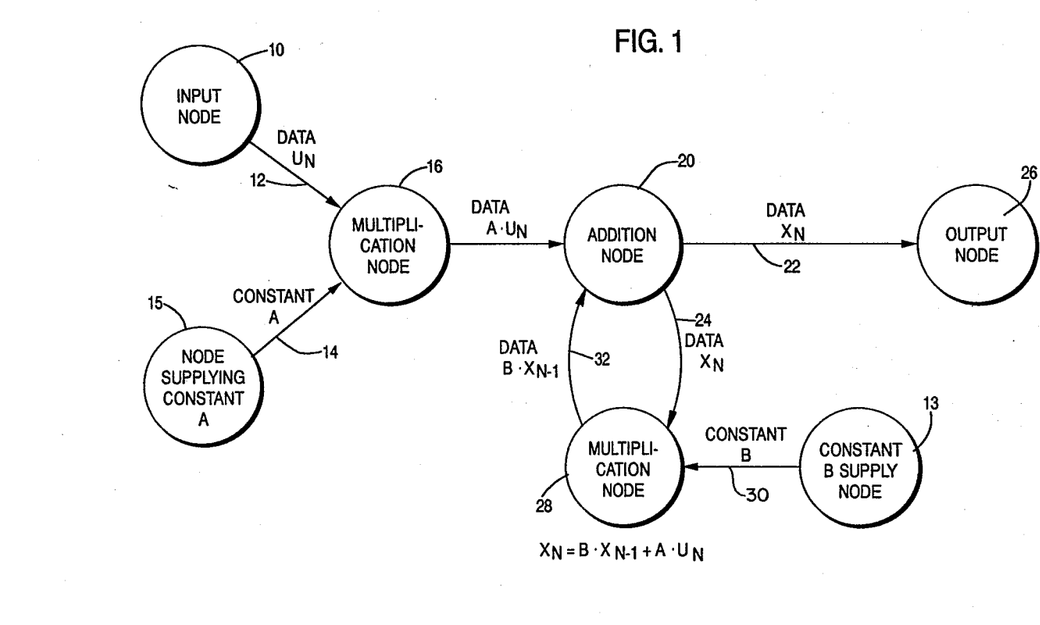
FIG. 1 is an example of an algorithm directed graph.

An algorithm graph of this recursive function is illustrated in FIG. 1 as described below. The second step in the preferred embodiment is to define the activities which occur in each primitive operation in a graphical fashion using a node marked graph. The third step is to combine the node graphs for each node to form a computational marked graph which fully defines the operations performed by a parallel processor in executing the algorithm. The computational marked graph can be input to a data processing system in a manner discussed further below.

A Petri net is a useful mathematical tool for modeling and analyzing systems containing interacting concurrent components. Petri nets were first developed in 1962 by Carl Petri in "Kommunikation mit Automaten", Ph.D. dissertation, University of Bonn, Bonn, West Germany, 1962, and were later identified as a useful analysis tool by Holt and Commoner in "Events and Conditions", Applied Data Research, New York, 1970. A comprehensive treatment of Petri nets is presented in J. L. Peterson, *Petri Net Theory and the Modeling of Systems*, Prentiss-Hall, Englewood, Cliffs, N.J., 1981.

In the usual Petri net representation of a system, events or actions which take place in the system are modeled by "transitions". The condition or status of the system is modeled by "places". The existence of a condition is indicated by marking the corresponding "place" with one or more "tokens" and nonexistence of the condition is indicated by the absence of any tokens. A marking vector M is a vector whose elements identify the number of tokens marking each place. The execution of a Petri net is controlled by the number and distribution of tokens in the net. A transition is enabled if each arc from its input places has at least one token. An enabled transition "fires" by removing one token from each arc directed from an input place to the transition and depositing into each output place one token for each arc directed from the transition to the place. Transition firings continue as long as at least one transition is enabled. When there are no enabled transitions, the execution of the net halts.

Two very important subclasses of Petri nets are state machines and directed graphs. A state machine is a Petri net in which each transition is restricted to having exactly one input place and one output place. A marked graph is a Petri net in which each place is restricted to having exactly one input transition and one output transition. Thus, a state machine can represent the conflicts by a place with several output transitions, but cannot model the creation and destruction of tokens required to model concurrency or the waiting which characterizes synchronization Marked graphs on the other hand, cannot model conflict or data-dependent decisions, but can model concurrency. For this reason, the present invention preferably uses marked graphs to model and analyze current processing systems.

The concept of time is not explicitly encoded in the definition of Petri nets. However, for performance evaluation and scheduling problems it is necessary to define time delays associated with transitions. Such a Petri net is known as a timed Petri net and is described in T. Murata, "Use of Resource Time Product Concept to Derive a Performance Measure of Timed Petri Nets", *Proceedings of MidWest Symposium on Circuits and Systems*. Vol. 28, pages 407–410, August, 1985. In a timed Petri net, enabling tokens are encumbered or reserved when a transition fires. After a specified delay time associated with the transition, tokens are deposited at the output places of the transition. Thus, a timed Petri net is used, according to the present invention, to provide an effective method for modeling the finite delay time associated with the completion of a primitive operation by a processor.

As discussed above, the first step in executing an algorithm according to the present invention is to decompose the algorithm and describe it using an algorithm directed graph. A simple example of an algorithm directed graph is illustrated in FIG. 1. This graph is characterized by nodes which represent the operation or function to be performed on a data packet or vector incident to that node. Directed arcs or "edges" of the graph represent the data labels of inputs to the primitive operations. Edges leaving a node represent the output of the primitive operations which are passed on to the next primitive operation in the algorithm.

In FIG. 1, node 10 represents supplying the Nth value of input U. When this data is supplied, a token is indicated on edge 12. A constant value is supplied on edge 14 from node 15 to node 16. When tokens representing both $U_N$ and A are available, the primitive operation V*M is performed in node 16 by "firing" the node. The result is a token on edge 18 indicating that the data $A \cdot U_N$ is available. This is supplied to node 20 which performs the primitive operation V+V adding the value of $B \cdot X_{N-1}$ to $A \cdot U_N$ and supplying the value $X_N$ on edges 22 and 24. While edge 22 supplies the value $X_N$ to an output node 26, edge 24 supplies the value $X_N$ to node 28 which performs the primitive operation V*M. Edge 30 supplies the constant B from node 31 to node 28 so that the value $B \cdot X_{N-1}$ can be supplied from node 28 to node 20 on edge 32.

Although the algorithm directed graph is useful in describing the computational flow, it does not address the procedures a particular computing structure must manifest in order to perform the task indicated on the graph. Further, the graph is ambiguous with regard to issues of protocol, deadlock and resource assignment when processing is to be achieved in a multiple processor environment. Of particular importance is how the sequence of data flow and operations are managed in a multiple computational resources environment which emphasizes maximum concurrent processing. An unambiguous representation of control/data flow is provided by a particular variety of Petri net termed a computational marked graph which permits data concerning control status and resource utilization to be monitored by the placement of "tokens" which may be tracked during execution of an algorithm. The development of the computational marked graph is accomplished by generating a node marked graph for each node in the algorithm directed graph.

In the preferred embodiment, the node marked graphs are generated after making certain assumptions about the system which will execute the algorithm. It is preferable to assume that the system comprises a plurality of functional units each of which includes processing capabilities, local memory for programmed storage and temporary input and output data containers. It is further assumed that a global data memory will be available to all functional units. Inputs associated with each edge in the algorithm directed graph correspond to fixed data containers in the global data memory. In the preferred embodiment, transfer of data from a functional unit through the global data memory is postponed until all successor computational nodes have accessed the data. This requirement helps reduce processing time, but leads to the necessity of providing data status information in the computational marked graph. Finally, a primitive operation will not be assigned to a functional unit unless the functional unit is available and all data required by the primitive operation is available.

Figure 2:
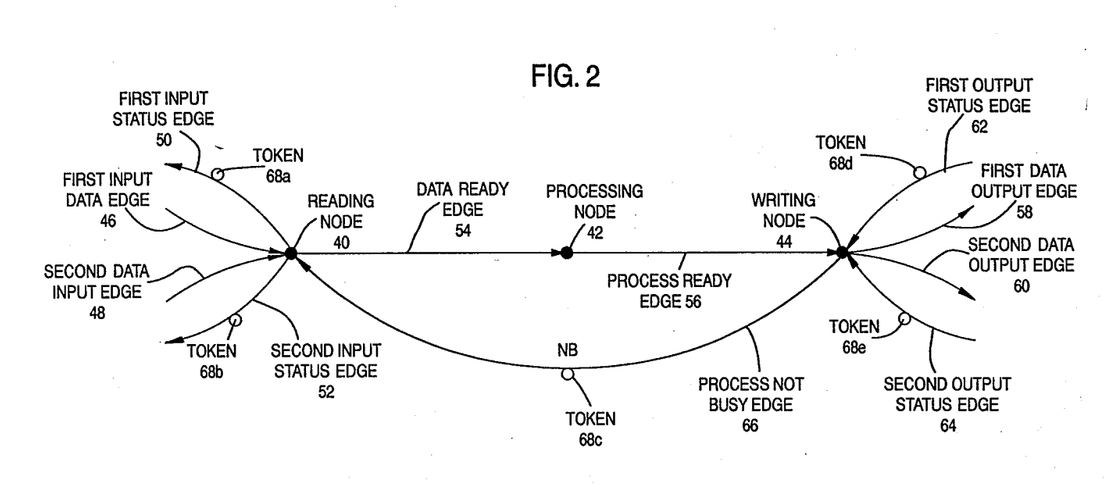
FIG. 2 is a node marked graph for a node in an algorithm marked graph having two inputs and two outputs.
Figure 3A:
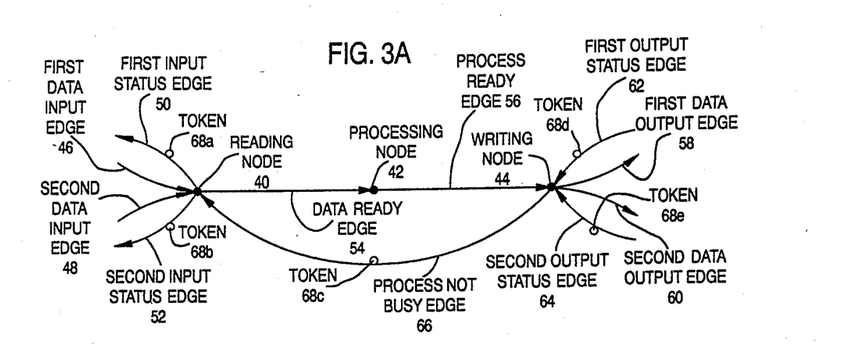
FIG. 3A is the node marked graph of FIG. 2 with tokens representing the idle state.
Figure 3B:
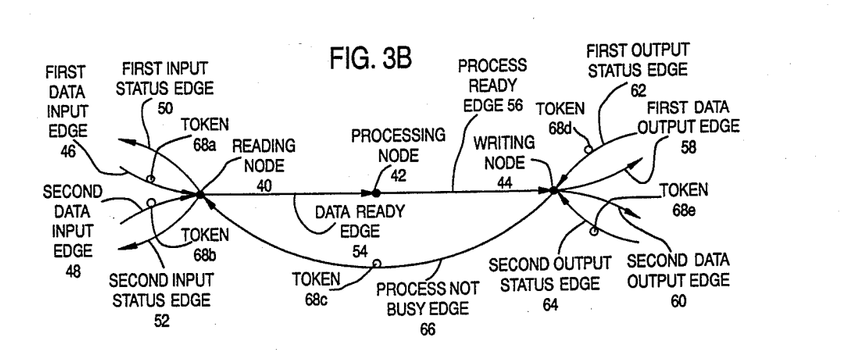
FIG. 3B is the node marked graph of FIG. 2 with tokens representing the process ready state.
Figure 3C:
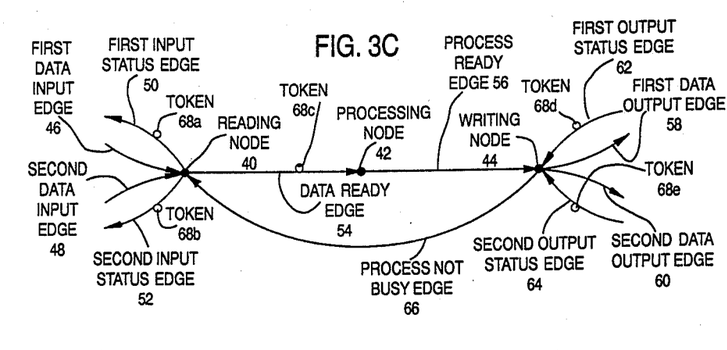
FIG. 3C is the node marked graph of FIG. 2 with tokens representing the data accepted state.
Figure 3D:
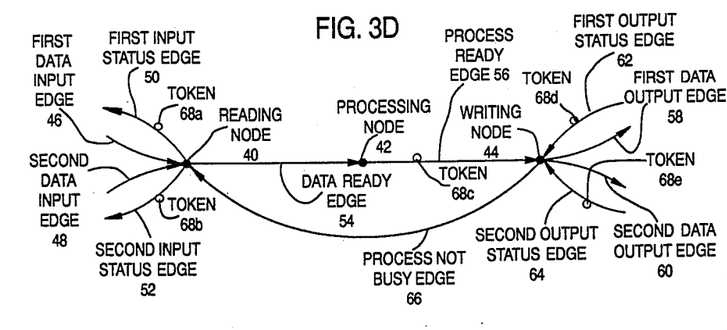
FIG. 3D is the node marked graph of FIG. 2 with tokens representing the processing function - outputs empty state.
Figure 3E:
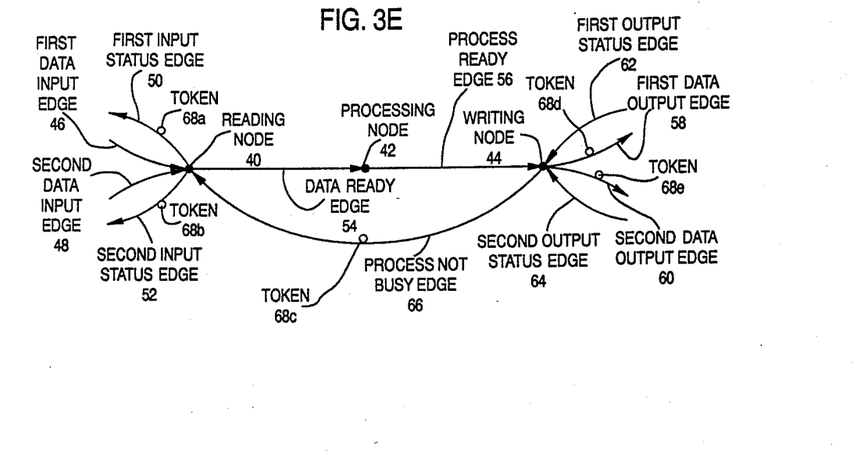
FIG. 3E is the node marked graph of FIG. 2 with tokens representing the process complete - outputs delivered state.
Figure 3F:
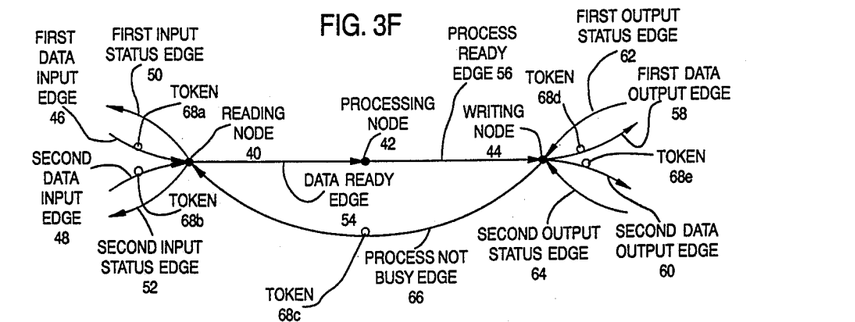
FIG. 3F is the node marked graph of FIG. 2 with tokens representing the process complete - inputs available state.
Figure 3G:
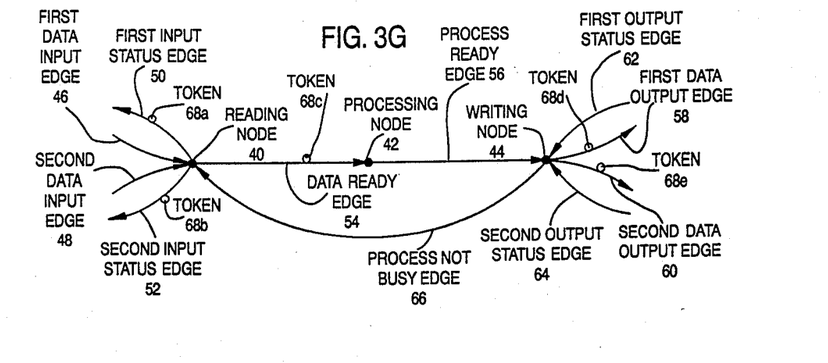
FIG. 3G is the node marked graph of FIG. 2 with tokens representing the data consumed state.

As a result of the requirement in the preferred embodiment that output data from a primitive operation be accessed by subsequent nodes prior to being stored in the global data memory, the node marked graph is developed with data status information being directed along an edge corresponding to each edge providing data between two nodes, but in a direction opposite to that of the data flow. In addition, one embodiment of the present invention breaks down each node of the algorithm directed graph into three nodes: reading, processing and writing. Such a three node marked graph is illustrated in FIG. 2, where node 40 is a reading node, node 42 is a processing node and node 44 is a writing node. Edge 46 provides a first input I1 and edge 48 provides a second input I2. Edge 50 provides data status corresponding to the first input I1 on edge 46, while edge 52 provides data status corresponding to the second input data on edge 48. A data ready signal is supplied along edge 54 to the processing node 42 when inputs I1 and I2 are full as indicated by tokens on edges 46 and 48 (see FIG. 3B). When the process or computation are formed by processing node 42 is completed, a token is placed along edge 56. Data output edges 58 and 60 are directed outward from output node 44, while edges 62 and 64 provide data status information regarding the use of the data output on edges 58 and 60, respectively, by subsequent primitive operations. When the output buffers have been emptied, a token is placed on edge 66 to indicate that the process is not busy. This state is represented by the tokens 68a–68e illustrated in FIGS. 2 and 3A.

Figure 3H:
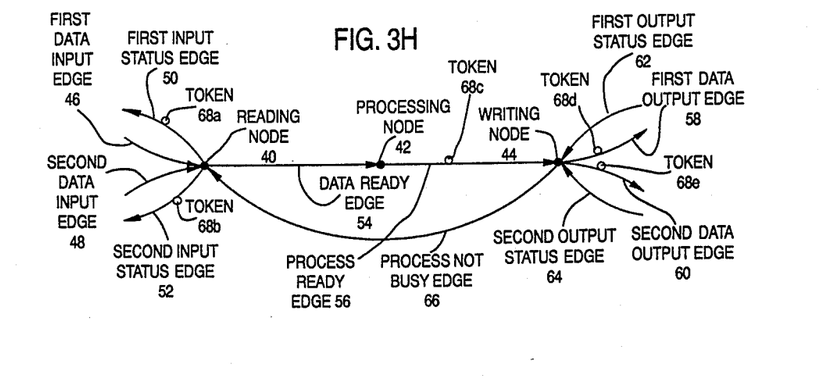
FIG. 3H is the node marked graph of FIG. 2 with tokens representing the process function - output buffer full state.

Eight possible states are illustrated in FIGS. 3A–3H. They respectively illustrate the idle state (FIG. 3A) which is also illustrated in FIG. 2; process ready - inputs enabled (FIG. 3B); data accepted - inputs consumed (FIG. 3C); performing processing (FIG. 3D); processing completed - outputs available (FIG. 3E); processing completed - inputs available (FIG. 3F.); data consumed - output buffers full (FIG. 3G); and performing processing - output buffers full (FIG. 3H).

Figure 4:
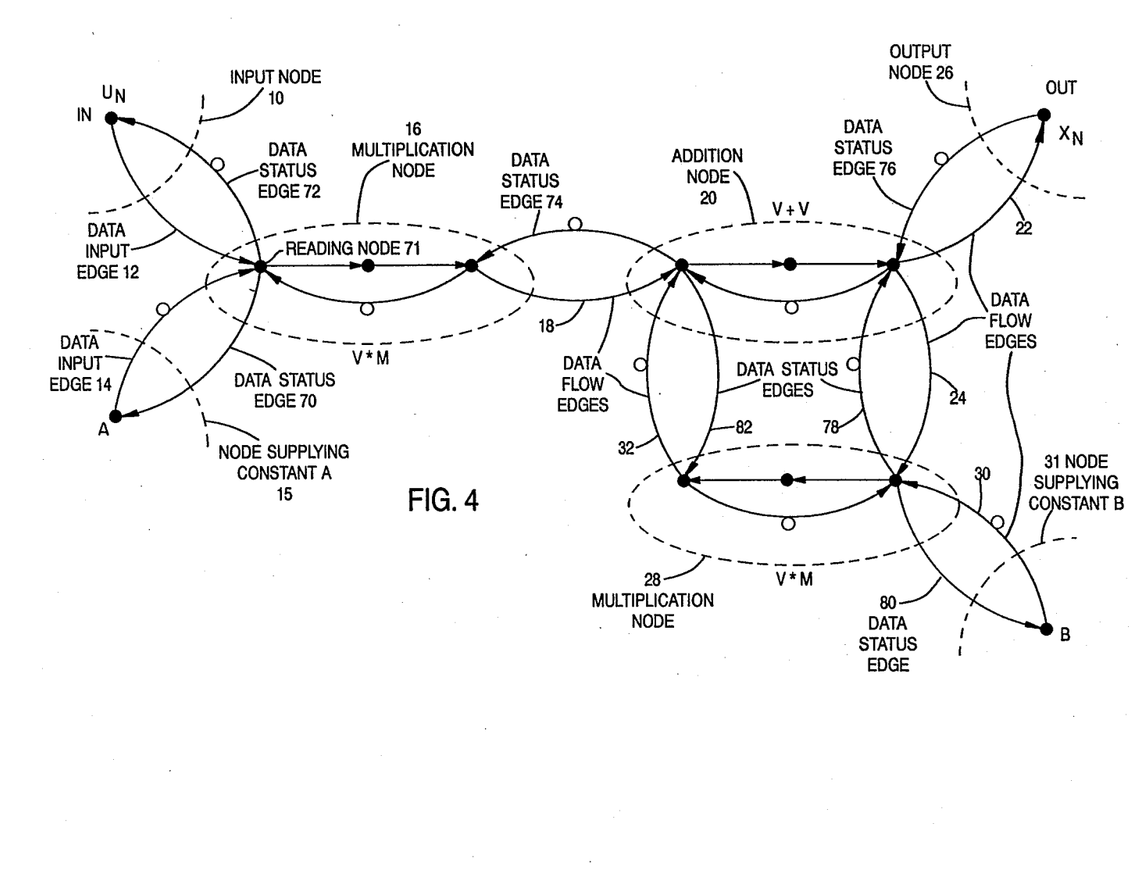
FIG. 4 is a computational marked graph corresponding to the algorithm marked graph in FIG. 1.

As discussed above, a computational marked graph is provided by replacing each of the nodes of the algorithm marked graph illustrated in FIG. 1 with a node marked graph like those illustrated in FIGS. 2 and 3A–3H. For the algorithm directed graph illustrated in FIG. 1, the corresponding computational marked graph is illustrated in FIG. 4. In other words, the computational marked graph of a particular algorithm is composed of interconnected node marked graphs by joining the various input edges to corresponding output edges of predecessor node marked graphs.

Preferably, the computational marked graph according to the present invention has several features. First, no more than one token is allowed in each place (edge) at a time. This is significant in that the occurrence of more than one token in a place would indicate overrunning data buffers or perhaps multiple allocation of a process. Second, data flow and bufferfull conditions are represented by directed arcs corresponding to the directed data flow of the original algorithm directed graph, while status and control information are provided on arcs corresponding to, but oppositely directed to the original data flow. For example, edge 14 in FIG. 4 corresponds to edge 14 in FIG. 1 in that the data A is supplied from node 15 to the algorithm node 16. Therefore, edge 70 is included to provide data status information indicating whether the input provided on edge 14 has been read by reading node 71. Similarly, edge 72 provides data status corresponding to the input data $U_N$ on edge 12 and edge 74 provides data status information corresponding to data flow edge 18. Similarly, edges 76, 78, 80 and 82 provide data status information corresponding to data flow paths 22, 24, 30 and 32. In addition, each of the processing nodes 16, 20 and 28 of the algorithm directed graph in FIG. 1 has been replaced in FIG. 4 with a node marked graph including reading, processing and writing nodes interconnected by three edges (arcs) as illustrated in FIG. 2. Nodes 16 and 28 have been replaced with node marked graphs which have only a single output, but otherwise they are constructed the same as the node marked graph illustrated in FIG. 2.

As is known in the art, Petri nets have properties which include safeness and liveness. As noted above, the marked graphs generated according to the present invention are required to have no more than one "token" in each "place" during execution of the algorithm represented by the graph. Thus, according to the conventional terminology, the Petri net represented by the computational marked graphs generated according to the present invention are "safe". A Petri net is considered to be "live" if every transistion is enabled during execution of the net, i.e., the algorithm. It is has been shown in Peterson (supra) that a marked graph is live if and only if the number of tokens on each cycle is at least one. Preferably, initialization of execution of an algorithm according to the present invention includes the requirement of a live marking.

One example of a parallel processing system which could be used to execute an algorithm defined as a computational marked graph, generated as discussed above, is illustrated in FIG. 5. In the parallel processing system embodiment illustrated in FIG. 5, an algorithm loader 102 is used to define algorithms as computational marked graphs and then load the computational marked graph to an assignment manager 104. The algorithm loader 102 is provided to simplify the user interface and permit diagnostics to be run to monitor the functioning of the parallel processors. However, once the algorithm or algorithms to be processed by the parallel processor have been supplied to the assignment manager 104, the algorithm loader 102 is no longer required and could be disconnected from the system.

Figure 5:
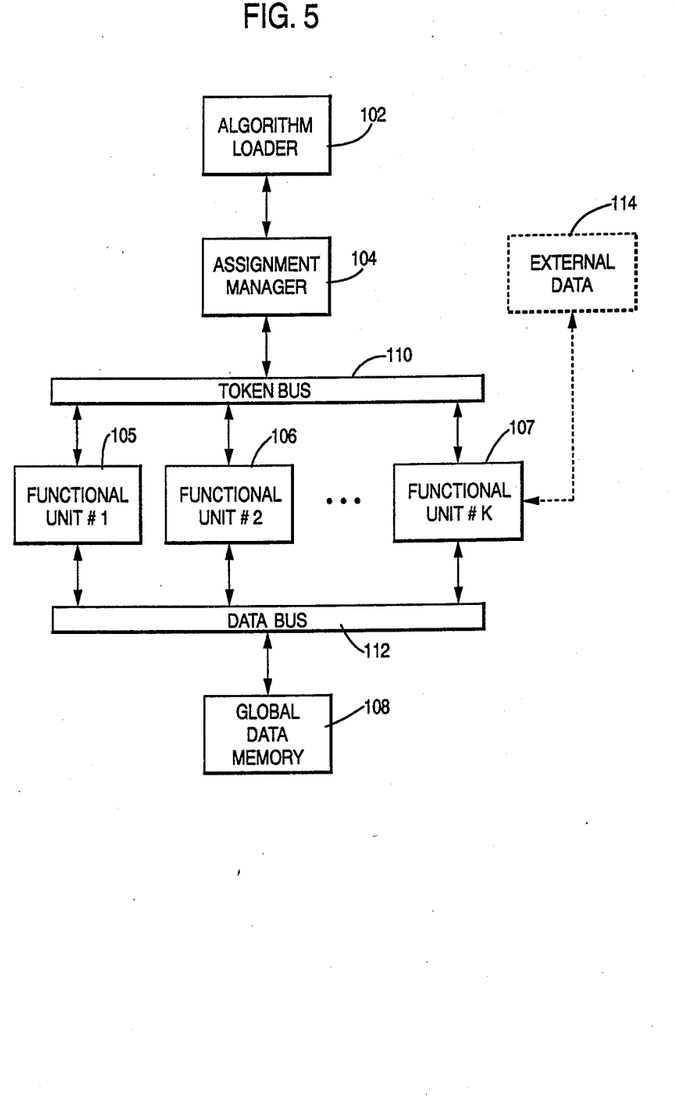
FIG. 5 is a block diagram of a parallel processing system to which the present invention can be applied.
Figure 6:
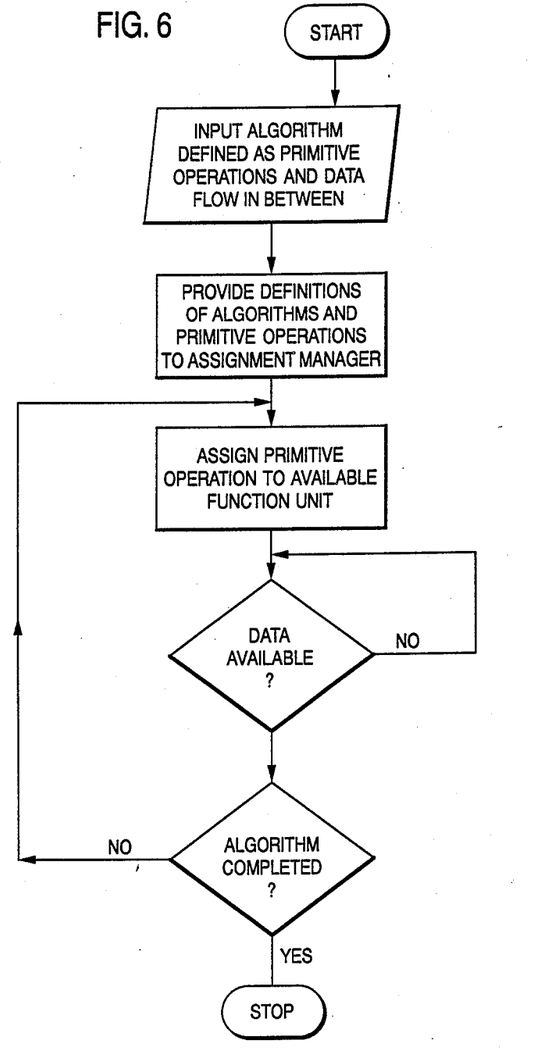
FIG. 6 is a flowchart of a method according to the present invention.

In addition to the assignment manager 104, the parallel processing system illustrated in FIG. 5 includes K functional units 105-107 and a global data memory 108. The functional units 105-107 are connected to the assignment manager 104 via a token bus 110 and to the global data memory 108 via a data bus 112. The units 104-108 may be identical with their role in the system determined only by the program being executed therein. This permits a high degree of redundancy allowing any of the units to perform the functions of the assignment manager or the global memory provided the necessary programs are stored in its memory and the proper connections are provided. For example, for testing purposes, a parallel processing system has been constructed in which the algorithm loader is an IBM PC/XT and each of the units 104-108 include an INTEL 8088 processor, 32 kbytes of memory and the required number of input/output ports in an S-100 bus enclosure with a power supply.

In the test system, the units 104-108 and 102 have been connected by RS-232 cables transmitting at 9600 baud. However, the present invention is by no means limited to such a system, but could be operated on any parallel processor system which includes a device to carry out the functions of the assignment manager described below. For example, the present invention could be applied to a system in which the functions of the assignment manager are performed by one or more of the functional units. Similarly, while the global memory 108 is illustrated as a separate unit, in an actual system, the memory associated with each of the functional units 105-107 might contain a copy of the contents of the global memory with transmission between the units occurring at the time that the data is to be stored in the global memory. In an actual system, it is expected that the units 104-108 may each comprise a single printed circuit board or even a single integrated circuit. In addition, instead of being identical units, the units 104-108 may be differentiated by the functions which they are intended to perform. For example, the global memory 108 may contain a larger amount of memory if a large amount of data is being processed. Also, one or more of the functional units, such as function unit 107 might contain additional input/output ports for receiving or transmitting data to or from the external data unit 114.

According to the present invention, an algorithm, defined as a computational marked graph, is executed by a system, such as that illustrated by in FIG. 5, as follows. The assignment manager 104 initiates execution of the algorithm by assigning nodes 2 the functional units in the manner described in the following paragraph. As the primitive operation performed by an initially activated functional unit is made available, the assignment manager 104 assigns the primitive operation which uses the produced data to another functional unit. Preferably, only the primitive operations to be performed by a functional unit and the data labels are assigned by the assignment manager 104. All data access and processing operations are performed by the functional units 105-107. Data from the functional units 105-107 is stored in and supplied to the functional units 105-107 by the processor in the global memory 108. As execution of the algorithm proceeds, the assignment manager monitors the completion of each transistion node by marking the appropriate edges or places in the computational marked graph stored in its memory with "tokens".

As illustrated in FIG. 5, the algorithm is executed in k functional units 105-107 by accessing data stored in the global data memory 108 via the data bus 112. Control and status information are passed between the functional units 105-107 and the assignment manager 104 via the token bus 110. The assignment manager 104 is primarily engaged in managing the buffer status of the inputs and outputs of each node. The operation of the assignment manager 104 and the type of data passed over the token bus 110 will be described below with reference to FIG. 2.

For a node in the computational graph with two inputs, I1 and I2, and two outputs 01 and 02, the node marked graph corresponds to the graph illustrated in FIG. 2. As noted above, the assignment manager 104 includes both processing capability and memory. The memory is used to store the following information for each node of the graph: node number; processing indicator; function name; and buffer status indicators for I1, I2, 01 and 02.

The data passed between the assignment manager 104 and the functional units 105-107 may be viewed as asynchronous handshaking. In one embodiment of a dataprocessing system to which the invention can be applied, the following messages are transmitted. These messages may be hard-wired or in the form of data packets.

To initiate the start of a computation, the assignment manger 104 first determines that node #1 is fireable by determining the status bits associated with the inputs of node #1 indicate that all input buffers are full (I1-f, I2-f) and the process is not busy (NB) as illustrated in FIG. 2. When these conditions are recognized, the assignment manager 104 sends a READY message over the token bus 110 to all of the functional units 105-107. The READY message preferably includes the name of the function to be processed and the inputs to be used. The available functional units may respond with an ACCEPT message containing the functional unit identification number and the function name. The assignment manager 104 acknowledges one of the ACCEPT messages with an IDACK response indicating the identification number of the functional unit to be assigned the function, the function to be performed, and the node number of the graph. The assignment manger 104 then updates the computational marked graph in its memory to indicate that the node corresponding to that node number (#1) has been assigned to a functional unit, i.e., functional unit 105. As soon as the indicated functional unit 105 has retrieved the input data from the global data memory 108, it transmits an INPUT message indicating its identification number and the input buffers which have been used. The assignment manager then updates the input status bits of the corresponding node in the computational marked graph stored in its memory and responds with an INACK message to acknowledge receipt of the input message.

When processing is completed, the functional unit executing the primitive operation transmits an output request message OUTRQ to the assignment manager 104 over the token bus 110. The output request message would include at least the functional unit identification number and the number of the node being processed. The assignment manager 104 responds with an output status message OUTSTAT indicating the identification number of the functional unit and the labels of the global data memory 108 to be used for the outputs 01 and 02. The functional unit 105 responds by transmitting the output data to the global data memory 108 via the data bus 112. When this process is complete, the functional unit 105 transmits an OUTPUT message to the assignment manager 104 via the token bus 110. The assignment manager 104 responds by updating the computational marked graph in its memory and transmitting an output acknowledge message OUTACK to the functional unit.

A system such as that described provides the benefits of highly efficient concurrent processing of primitive operations in an algorithm while minimizing the efforts involved in programming and providing a large amount of fault tolerance, even the failure of a functional unit during execution of the algorithm. In addition, the number of functional units need not be known at the time that the algorithm is defined as a computational marked graph.

Many other features and advantages of the present invention are apparent from the detailed specification, and thus, it is intended by the appended claims to cover all such features and advantages which fall within the spirit and scope of the invention. Further, since numerous modifications and changes will readily occur to those skilled in the art, from the disclosure of the invention, it is not desired to limit the invention to the exact construction and operation illustrated and described. For example, while graph terminology has been used in describing the operation of the assignment manager, the present invention is not limited to a graph oriented system, but rather is applicable to any concurrent execution of an algorithm in which primitive operations are continuously assigned by functional units during execution of an algorithm by an assignment manager. Accordingly, suitable modifications and equivalents may be resorted to, all falling within the scope and spirit of the invention.

What is claimed is:

1. A method for concurrent execution of primitive operations in an algorithm by a data processing system having a data-driven architecture comprising an assignment manager, a plurality of functional units connected to the assignment manager and a global data memory connected to the functional units, said method comprising the steps of:
   (a) inputting an algorithm defined in terms of primitive operations and data flow between the primitive operations, including the steps of
   (ai) generating an algorithm directed graph containing nodes representing primitive operations and data flow arcs representing data flow in the algorithm;
   (aii) generating a node marked graph for each of the nodes in the algorithm directed graph generated in step (ai), the node marked graph including at least one input edge and at least one output edge corresponding to the data flow arcs associated with the corresponding node in the algorithm directed graph, and data status edges, each of the data status edges corresponding to one of the input and output edges;
   (aiii) generating a computational marked graph corresponding to the algorithm directed graph generated in step (ai) by combining the node marked graphs generated in step (aii), each output edge of a predecessor node being associated with an input edge of the successor node; and
   (aiv) storing data representing the computational marked graph in the data processing system;
   (b) automatically providing definitions of the algorithm and the primitive operations to the assignment manager;
   (c) assigning each primitive operation to an available function unit in dependence upon the definitions previously defined as the data for that primitive operation becomes available, said assigning performed by the assignment manager; and
   (d) monitoring in the assignment manager completion of each primitive operation to determine data availability.

2. A method as recited in claim 1,
   wherein the algorithm directed graph contains at least one processing node, and
   wherein step (aii) comprises the step of defining input, processing and output transitions for each of the processing nodes in the algorithm directed graph.

* * * * *